(12) United States Patent
Tevis

(10) Patent No.: US 6,601,926 B2
(45) Date of Patent: Aug. 5, 2003

(54) AIR RESERVOIR FOR AIR BRAKE SYSTEM

(75) Inventor: Ethan Michael Tevis, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 23 days.

(21) Appl. No.: 09/932,931

(22) Filed: Aug. 21, 2001

(65) Prior Publication Data

US 2003/0038535 A1 Feb. 27, 2003

(51) Int. Cl.[7] .................................................. B60T 11/34
(52) U.S. Cl. ......................... 303/85; 220/500; 137/576
(58) Field of Search ............................. 303/85, 86, 87, 303/56; 220/500, 501, 502; 137/571, 576

(56) References Cited

U.S. PATENT DOCUMENTS

| | | |
|---|---|---|
| 1,661,933 A | 3/1928 | Farrell |
| 1,952,867 A | 3/1934 | Jensen |
| 2,092,392 A | 9/1937 | Hewitt |
| 3,223,118 A | 12/1965 | Hutelmyer |
| 3,383,002 A | 5/1968 | Fleming et al. |
| 3,456,686 A | 7/1969 | Kemble et al. |
| 4,564,246 A | 1/1986 | Billeter ........................ 303/85 |
| 5,307,836 A | 5/1994 | Niceley ..................... 137/576 |

*Primary Examiner*—Pam Rodriguez
(74) *Attorney, Agent, or Firm*—Finnegan, Henderson, Farabow, Garrett & Dunner L.L.P.

(57) ABSTRACT

An air reservoir for an air brake system is provided. The air reservoir includes a housing that has a first air chamber, a second air chamber, and a supply air chamber. A first valve is disposed between the supply air chamber and the first air chamber and is configured to allow air to flow from the supply air chamber to the first air chamber. A second valve is disposed between the supply air chamber and the second air chamber and is configured to allow air to flow from the supply air chamber to the second air chamber.

17 Claims, 3 Drawing Sheets

AIR RESERVOIR FOR AIR BRAKE SYSTEM

TECHNICAL FIELD

The present invention is directed to an air reservoir for an air brake system. More particularly, the present invention is directed to a multiple-chambered air reservoir for an air brake system disposed on a vehicle.

BACKGROUND

Air brakes are commonly used as the braking mechanisms for large vehicles. In an air brake system, pressurized air provides the power necessary to stop or slow the vehicle. Each air brake system typically includes an air reservoir that houses a supply of pressurized air provided by a compressor. When the operator engages the brakes on a moving vehicle, the pressurized air is directed from the reservoir to the air brake, which results in the engagement of the brake pads or shoes with the brake drum and the slowing of the vehicle.

As shown in U.S. Pat. No. 5,307,836, an air reservoir for an air brake system may include two compartments. The compartments include a supply chamber and a secondary chamber. A one-way valve is positioned between the compartments to allow pressurized air to flow from the supply chamber to the secondary chamber. In this arrangement, the secondary chamber acts as a back-up chamber in the event of an emergency.

Some types of vehicles, such as, for example, motor graders, utilize an air braking system that includes two separate air brakes. Typically, there is one brake for either side of the vehicle, i.e. a left brake for the left side of the vehicle and a right brake for the right side of the vehicle. In a motor grader, the vehicle includes a two wheel set called a "tandem" on either side of the vehicle. The left brake is associated with the left tandem and the right brake is associated with the right tandem.

Safety regulations for vehicles that include two separate air brakes require that the vehicle must include a separate air supply chamber for each air brake. This ensures that each air brake has its own air supply so that if a leak or other problem were to develop with one air brake, the other air brake would remain operational. However, to supply pressurized air to the two separate supply chambers from a single compressor requires multiple fittings and connections. Typically, a "T" fitting is used to split the air flow from the compressor into two separate lines, each of which is then connected to the respective air supply chamber. Each additional fitting and connector in the supply lines provides an increased chance of leakage. In addition, these additional fittings and connectors add to the overall cost of the brake system and increase the time required to assemble and install the air brake system.

The present invention provides an air reservoir for an air brake system that solves all or some of the problems set forth above.

SUMMARY OF THE INVENTION

One aspect of the present invention is directed to an air reservoir for an air brake system. The air reservoir includes a housing having a first air chamber, a second air chamber, and a supply air chamber. A first valve is disposed between the supply air chamber and the first air chamber and is configured to allow air to flow from the supply air chamber to the first air chamber. A second valve is disposed between the supply air chamber and the second air chamber and is configured to allow air to flow from the supply air chamber to the second air chamber.

In another aspect, the present invention is directed to an air brake system that includes a first brake and a second brake. The system further includes an air reservoir that has a housing containing a first air chamber connected to the first brake, a second air chamber connected to the second brake, and a supply air chamber. A first valve is disposed between the supply air chamber and the first air chamber and is configured to allow air to flow from the supply air chamber to the first air chamber. A second valve is disposed between the supply air chamber and the second air chamber and is configured to allow air to flow from the supply air chamber to the second air chamber.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the present invention and together with the description, serve to explain the principles of the invention. In the drawings.

DETAILED DESCRIPTION

Reference will now be made in detail to an embodiment of the present invention, an example of which is illustrated in the accompanying drawings. Wherever possible, the same reference numbers will be used throughout the drawings to refer to the same or like parts.

Figure 1:
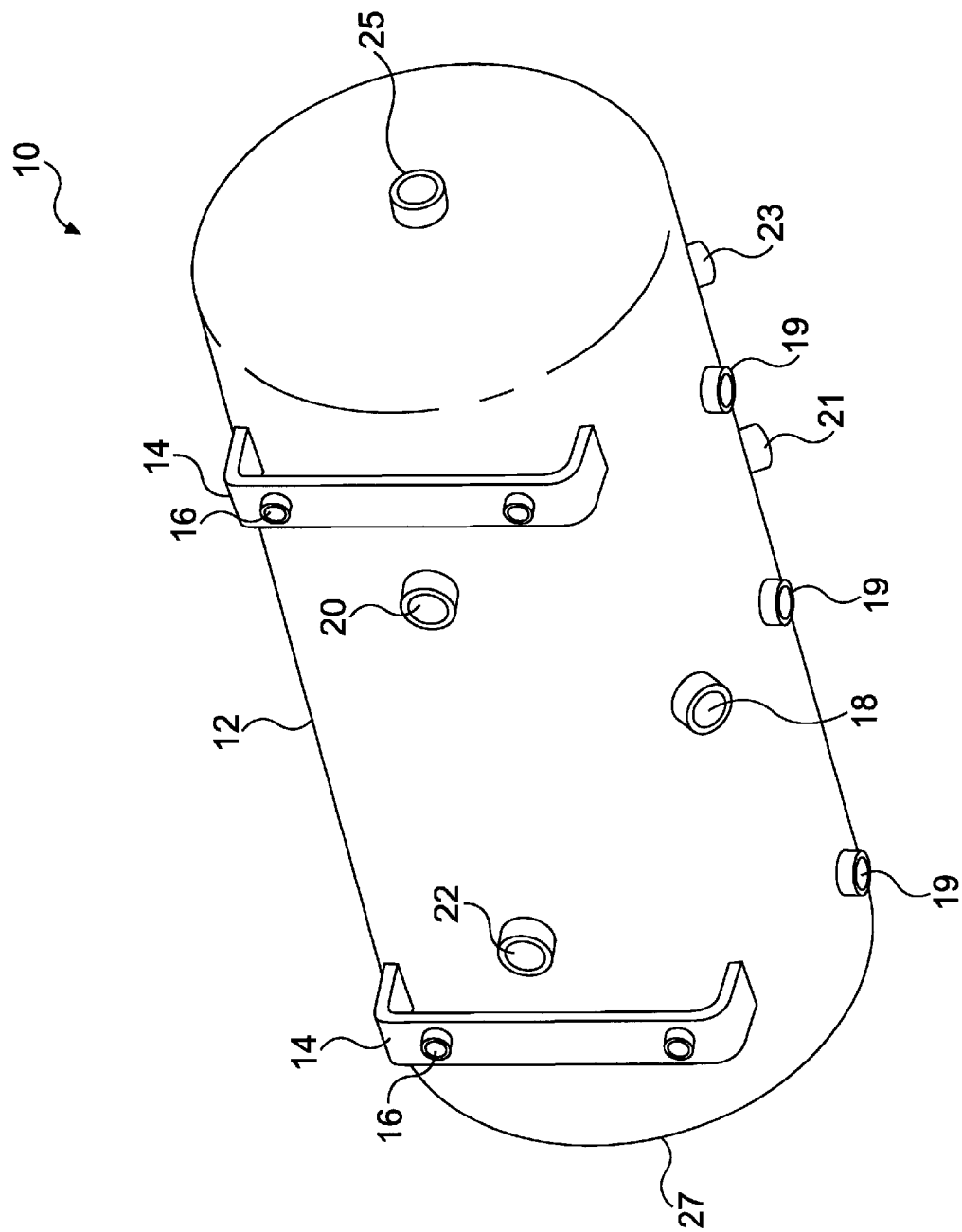
FIG. 1 is a pictorial representation of an air reservoir in accordance with an embodiment of the present invention.

As illustrated in FIG. 1, a reservoir 10 is provided. Reservoir 10 includes a housing 12. Housing 12 may form a substantially cylindrical shell and is made of any material capable of holding compressed air, such as, for example, steel, alloys, or other metals.

As also illustrated in FIG. 1, a pair of mounting brackets 14 are connected to housing 12. Mounting brackets 14 include openings 16. Bolts, or other fastening mechanisms, may be disposed through openings 16 to mount reservoir 10 to a vehicle.

Figure 2:
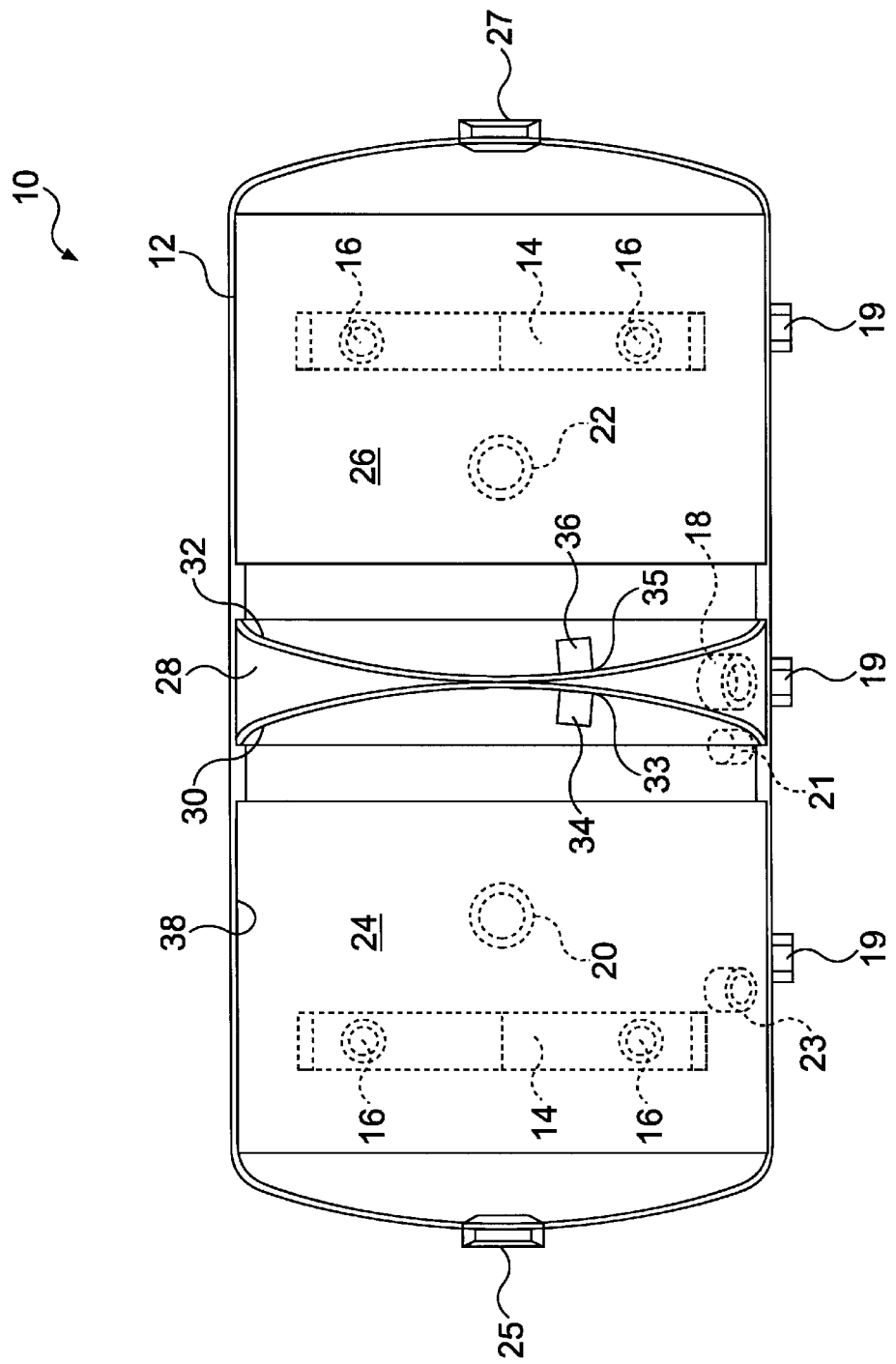
FIG. 2 is a sectional view of the air reservoir of FIG. 1.

As shown in FIG. 2, housing 12 of reservoir 10 includes a first baffle 30 and a second baffle 32. First baffle 30 and second baffle 32 are fixed to an interior surface 38 of housing 12. First baffle 30 and second baffle 32 may be fixed to interior surface 38 through any process capable of forming a sealed chamber, such as, for example, welding.

First baffle 30 and second baffle 32 are disposed in housing 12 to form a first air chamber 24, a second air chamber 26, and a supply air chamber 28 within housing 12. First air chamber 24 may also be referred to as the primary chamber and second air chamber 26 may also be referred to as the secondary chamber. As illustrated in this exemplary embodiment, first air chamber 24 and second air chamber are disposed on opposite sides of supply air chamber 28 and are configured to hold substantially equivalent volumes of air.

As also shown in FIG. 2, first baffle 30 includes a first opening 33 configured to receive a first valve 34. First valve 34 provides a fluid passageway that connects supply air chamber 28 with first air chamber 24. First valve 34 may be a one-way valve such as, for example, a check valve.

Second baffle 32 includes a second opening 35 configured to receive a second valve 36. Second valve 36 provides a fluid passageway that connects supply air chamber 28 with second air chamber 26. Second valve 36 may be a one-way valve such as, for example, a check valve.

As shown in FIGS. 1 and 2, reservoir 10 also includes an inlet port 18. Inlet port 18 provides a fluid passageway through housing 12 to supply air chamber 28. Inlet port 18 may include a connector, such as, for example, threads or a snap fitting, to allow an air supply line 53 (referring to FIG. 3) to be quickly and easily attached to inlet port 18.

Reservoir 10 also includes a first outlet port 20 and a second outlet port 22. First outlet port 20 provides a fluid passageway through housing 12 to first air chamber 24. Second outlet port 22 provides a fluid passageway through housing 12 to second air chamber 26. Each of the first and second outlet ports 20, 22 may include a connector, such as, for example, threads or a snap fitting, to allow an air line 58, 60 (referring to FIG. 3) to be quickly and easily attached thereto.

As shown in FIGS. 1 and 2, housing 12 may include a series of purge ports 19. Purge ports 19 provide a fluid passageway through housing 12 to each of first air chamber 24, second air chamber 26, and supply air chamber 28. Purge ports 19 are located on the bottom of housing 12 and may be opened to drain moisture that collects within housing 12.

As shown in FIGS. 1 and 2, housing 12 may include a first access opening 25 and a second access opening 27. First and second access openings 25, 27 are disposed on opposite sides of housing 12. First access opening 25 is configured to align with first valve 34 and second access opening 27 is configured to align with second valve 36. Each of the first and second access openings 25, 27 are large enough to allow for repair and/or replacement of first and second valves 34 and 36.

In addition, first and second access openings 25, 27 may include a connector, such as threads or a snap lock, to allow an accessory tool, such as a washing implement, to be attached thereto. In this manner, the supply of compressed air held in first air chamber 24 and second air chamber 26 may be used for an alternative purpose, such as cleaning dirt and debris from the vehicle.

A relief valve 21 may also be disposed in housing 21. Relief valve 21 provides a fluid passageway between supply air chamber 28 and the environment. Relief valve 21 may be configured to open at a predetermined pressure that is greater than the expected operating pressures of reservoir 10. If the pressure of the air in supply air chamber 28 reaches the predetermined pressure, relief valve 21 will open to allow air to escape to the environment. In this manner, potentially hazardous situations caused by the over-pressurization of reservoir 10 may be avoided.

Figure 3:
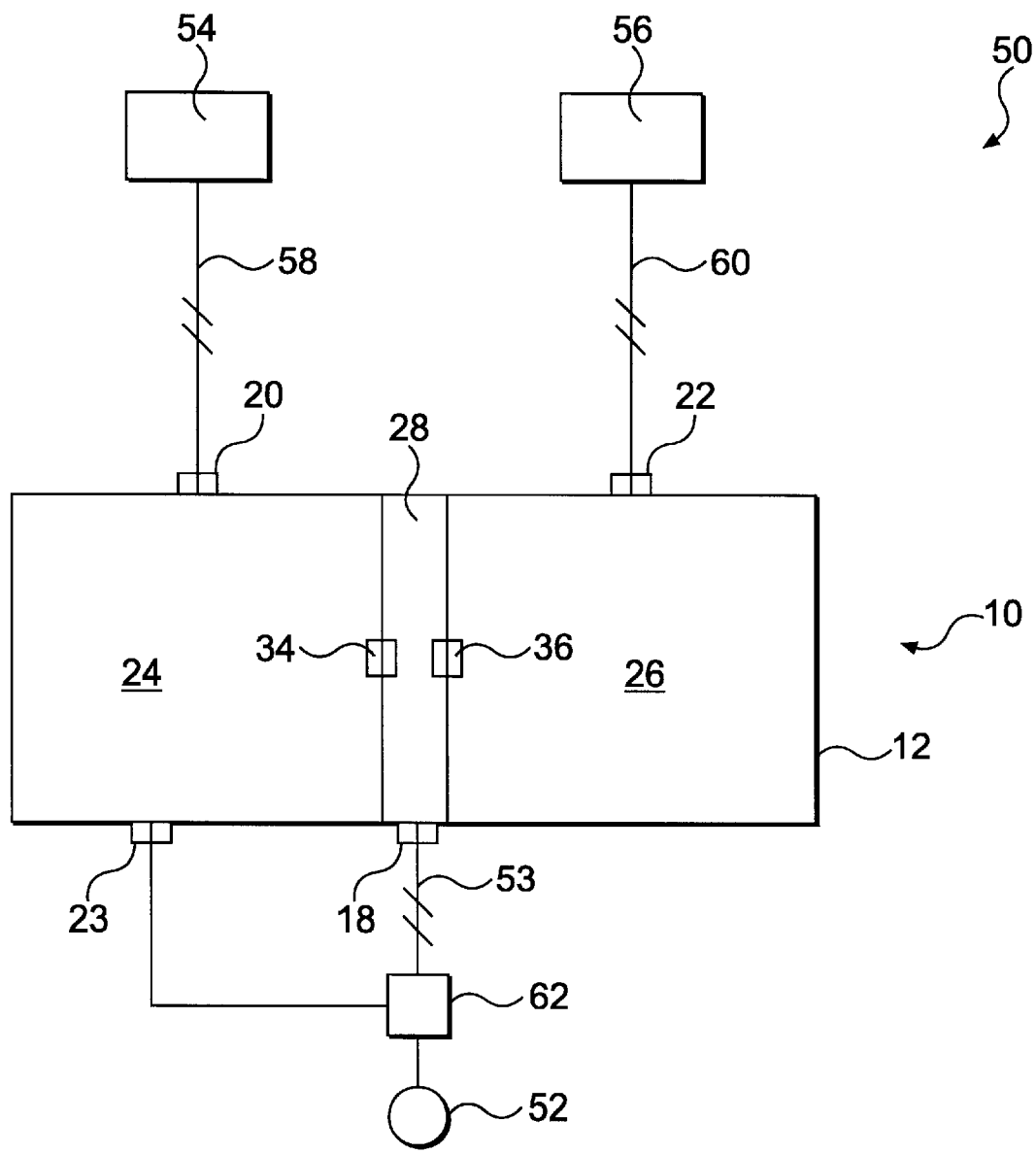
FIG. 3 is a schematic and diagrammatic representation of an air brake system according to an embodiment of the present invention.

As illustrated in FIG. 3, reservoir 10 may be included as part of an air brake system 50 that includes a first brake 54 and a second brake 56. First supply line 58 connects first brake 54 with first outlet port 20. Second supply line 60 connects second brake 56 with second outlet port 22. First and second brakes 54 and 56 may be any type of air brake, such as, for example, tandem brakes. Air brake system 50 may be disposed on any type of vehicle, such as, for example, a motor grader, that utilizes a dual air brake system.

An air supply line 53 connects a compressor 52 to inlet port 18. Compressor 52 is operable to provide pressurized air to supply air chamber 28. Compressor 52 may be part of the vehicle's engine system or may be a separate compressing unit.

A governor port 23 may also be disposed in housing 12. Governor port 23 provides a fluid passageway from first air chamber 24 to a regulating device 62, which may be, for example, a pilot valve. When the pressure of the air in first air chamber 24 drops below a predetermined level, regulating device 62 opens a valve or other mechanism to allow pressurized air to flow from compressor 52 to inlet port 18. When the pressure of the air in first air chamber 24 is sufficient, regulating device 62 stops the flow of pressurized air from compressor 52 to inlet port 18.

Similarly, a second governor port (not shown) may be disposed in housing 12. The second governor port may provide a fluid passageway from second air chamber 26 to regulating device 62. When the pressure of the air in second air chamber 26 drops below a predetermined level, regulating device 62 opens a valve or other mechanism to allow pressurized air to flow from compressor 52 to inlet port 18. When the pressure of the air in second air chamber 26 is sufficient, regulating device 62 stops the flow of pressurized air from compressor 52 to inlet port 18.

In addition, a third governor port (not shown) may be disposed in housing 12. The third governor port may provide a fluid passageway from supply air chamber 28 to regulating device 62. When the pressure of the air in first or second air chamber 24, 26 drops below a predetermined level, regulating device 62 opens a valve or other mechanism to allow pressurized air to flow from compressor 52 to inlet port 18. When the pressure of the air in second air chamber 26 is sufficient, regulating device 62 stops the flow of pressurized air from compressor 52 to inlet port 18.

Industrial Applicability

The operation of the aforementioned system will now be described with reference to the attached drawings. Reservoir 10 is mounted to a vehicle as part of air braking system 50 and connected to compressor 52. During the operation of the vehicle, compressor 52 provides a supply of pressurized air.

The flow of air from compressor 52 to supply air chamber 28 may be controlled by regulating device 62, which is connected to first air chamber 24 via governor port 23. When the pressure of the air in first air chamber 24 is below a certain level, regulating device 62 opens and pressurized air flows through inlet port 18 into supply air chamber 28.

When the pressure of the air in supply air chamber 28 is greater than the pressure of the air in first air chamber 24, first valve 34 will open to allow pressurized air to flow into first air chamber 24. Similarly, when the pressure of the air in the supply air chamber 28 is greater than the pressure of the air in second air chamber 26, second valve 36 will open to allow pressurized air to flow into second air chamber 26. First valve 34 and second valve 36 may be one-way valves, i.e. check valves, so that pressurized air will not flow from first and second air chambers 24, 26 to supply air chamber 28.

When the operator of the vehicle engages, for example, first brake 54 of braking system 50, pressurized air flows from first air chamber 24 through first supply line 58 to first brake 54. The pressurized air from reservoir 10 is used by first brake 54 to engage first brake 54 to slow the vehicle or prevent the vehicle from moving. Similarly, when the operator of the vehicle engages second brake 56 of braking system 50, pressurized air flows from second air chamber 26 through second supply line 60 to second brake 56. The pressurized air from reservoir 10 is used by second brake 56 to engage second brake 56 to slow the vehicle of prevent the vehicle from moving. When the operator releases either or both of first and second brake 54 and 56, the pressurized air in the respective brake is released to the environment so that the brake is disengaged.

First and second air chambers 24, 26 of braking system 50 provide separate supplies of pressurized air for the separate air brakes. Accordingly, if a leak were to develop between the reservoir and one of the brakes, only the pressurized air in the air chamber associated with the particular brake would be lost. The other air chamber would not be affected, and the pressurized air contained therein would be available for use with the other brake.

The reservoir of the present invention, therefore, provides a single supply chamber that supplies pressurized air to separate air chambers in a dual air brake system. In this manner, the present invention obviates the need to divide the air line coming from the compressor into separate lines for each air chamber. This reduces the amount of exterior connections and fittings required to direct the pressurized air from the compressor to the separate air chambers. The reduction in number of the fittings and connections reduces the likelihood of leaks and also reduces the cost and time required to assemble the air brake system.

Thus, the present invention has wide applications in a variety of vehicles including a dual air brake system. The present invention may provide advantages in that it provides a cost effective and highly efficient air reservoir for an air brake system.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An air reservoir for an air brake system, comprising:
   a housing having a first baffle and a second baffle, the first baffle separating a first air chamber from a supply air chamber and the second baffle separating a second air chamber from the supply air chamber;
   a first valve disposed in the first baffle between the supply air chamber and the first air chamber and configured to allow air to flow from the supply air chamber to the first air chamber; and
   a second valve disposed in the second baffle between the supply air chamber and the second air chamber and configured to allow air to flow from the supply air chamber to the second air chamber.

2. The reservoir of claim 1, wherein the supply air chamber is disposed between the first air chamber and the second air chamber.

3. The reservoir of claim 1, further including an inlet port disposed in the housing and in flow communication with the supply air chamber.

4. The reservoir of claim 3, further including a first outlet port disposed in the housing and in flow communication with the first air chamber and a second outlet port disposed in the housing and in flow communication with the second air chamber.

5. The reservoir of claim 1, wherein the first and second valves are check valves.

6. The reservoir of claim 5, wherein the housing includes a first access opening configured to provide access to the first check valve and a second access opening configured to provide access to the second check valve.

7. The reservoir of claim 1, wherein each of the first air chamber, the second air chamber, and the supply air chamber includes a purge port.

8. An air brake system, comprising:
   a first brake;
   a second brake;
   an air reservoir including a housing having a first air chamber connected to the first brake, a second air chamber connected to the second brake, and a supply air chamber;
   a first valve disposed between the supply air chamber and the first air chamber and configured to allow air to flow from the supply air chamber to the first air chamber; and
   a second valve disposed between the supply air chamber and the second air chamber and configured to allow air to flow from the supply air chamber to the second air chamber.

9. The system of claim 8, further including a first supply line connecting the first air chamber to the first brake and a second supply line connecting the second air chamber to the second brake.

10. The system of claim 8, wherein the housing further includes a first baffle separating the first air chamber from the supply air chamber and a second baffle separating the second air chamber from the supply air chamber.

11. The system of claim 10, wherein the supply air chamber is disposed between the first air chamber and the second air chamber.

12. The system of claim 10, further including an inlet port disposed in the housing and in flow communication with the supply air chamber.

13. The system of claim 12, further including a first outlet port disposed in the housing and in flow communication with the first air chamber and a second outlet port disposed in the housing and in flow communication with the second air chamber.

14. The system of claim 8, wherein the first and second valves are check valves.

15. The system of claim 14, wherein the housing includes a first access opening configured to provide access to the first check valve and a second access opening configured to provide access to the second check valve.

16. The system of claim 8, wherein each of the first air chamber, the second air chamber, and the supply air chamber includes a purge port.

17. The system of claim 8, further including a compressor configured to provide pressurized air to the supply air chamber.

* * * * *